United States Patent
Thornton et al.

(10) Patent No.: US 6,488,798 B1
(45) Date of Patent: Dec. 3, 2002

(54) METHOD OF MAKING IMAGEABLE SEAMED INTERMEDIATE TRANSFER BELTS HAVING BURNISHED SEAMS

(75) Inventors: Constance J. Thornton, Ontario, NY (US); Edward L. Schlueter, Jr., Rochester, NY (US); Joseph A. Swift, Ontario, NY (US); Santokh S. Badesha, Pittsford, NY (US); Theodore Lovallo, Williamson, NY (US); Xiaoying (Elizabeth) Yuan, Fairport, NY (US); T. Edwin Freeman, Webster, NY (US)

(73) Assignee: Xerox Corporation, Stamford, CT (US)

( * ) Notice: Subject to any disclaimer, the term of this patent is extended or adjusted under 35 U.S.C. 154(b) by 53 days.

(21) Appl. No.: 09/723,560

(22) Filed: Nov. 28, 2000

(51) Int. Cl.[7] .......................... B32B 31/22; B65G 15/30
(52) U.S. Cl. .................. 156/154; 156/304.1; 156/304.5
(58) Field of Search .............................. 156/154, 304.1, 156/304.5, 153; 474/254

(56) References Cited

U.S. PATENT DOCUMENTS

| 5,487,707 A | 1/1996 | Sharf et al. ................ 474/253 |
|---|---|---|
| 5,514,436 A | 5/1996 | Schlueter, Jr. et al. ........ 428/57 |
| 5,549,193 A | 8/1996 | Schlueter, Jr. et al. ... 198/844.2 |
| 5,721,032 A | 2/1998 | Parker et al. .................. 428/57 |
| 6,245,402 B1 * | 6/2001 | Schlueter, Jr. et al. ........ 428/58 |
| 6,261,659 B1 * | 7/2001 | Fletcher et al. ............... 428/58 |

FOREIGN PATENT DOCUMENTS

JP  411024437 A  *  1/1999  .......... G03G/15/16

* cited by examiner

Primary Examiner—Jeff H. Aftergut
Assistant Examiner—Todd J. Kilkenny
(74) Attorney, Agent, or Firm—Lloyd Bean, II

(57) ABSTRACT

Imageable seamed intermediate transfer belts having a large seam surface area, and marking machines that use such imageable seamed intermediate transfer belts. The seamed intermediate transfer belt having an inner surface and an outer surface having predefine surface properties for the purpose of imaging. A belt is formed from a semiconductive substrate having a first end and a second end that are mated to form a seam. An adhesive is disposed over the joint whereupon joint can be burnished or overcoated with a material that substantially imitate predefined surface properties of the belt.

2 Claims, 9 Drawing Sheets

METHOD OF MAKING IMAGEABLE SEAMED INTERMEDIATE TRANSFER BELTS HAVING BURNISHED SEAMS

Cross reference is made to the following application filed concurrently herewith: U.S. Ser. No. 09/723,833 entitled "Method of Overcoating A Seam", still pending.

FIELD OF THE INVENTION

This invention relates to seamed belts.

BACKGROUND OF THE INVENTION

Electrophotographic printing is a well-known and commonly used method of copying or printing documents. Electrophotographic printing is performed by exposing a light image representation of a desired document onto a substantially uniformly charged photoreceptor. In response to that light image the photoreceptor discharges, creating an electrostatic latent image of the desired document on the photoreceptor's surface. Toner is then deposited onto that latent image, forming a toner image. The toner image is then transferred from the photoreceptor onto a receiving substrate such as a sheet of paper. The transferred toner image is then fused with the substrate, usually using heat and/or pressure. The surface of the photoreceptor is then cleaned of residual developing material and recharged in preparation for the production of another image.

The foregoing generally describes black and white electrophotographic printing machines. Electrophotographic printing can also produce color images by repeating the above process for each color of toner that is used to make the color image. For example, the photoreceptive surface may be exposed to a light image that represents a first color, say black. The resultant electrostatic latent image can then be developed with black toner particles to produce a black toner layer that is subsequently transferred onto a receiving substrate. The process can then be repeated for a second color, say yellow, then for a third color, say magenta, and finally for a fourth color, say cyan. When the toner layers are placed in superimposed registration the desired composite color toner image is formed and fused on the receiving substrate.

The color printing process described above superimposes the color toner layers directly onto a substrate. Other electrophotographic printing systems use intermediate transfer belts. In such systems successive toner layers are electrostatically transferred in superimposed registration from the photoreceptor onto an intermediate transfer belt. Only after the composite toner image is formed on the intermediate transfer belt is that image transferred and fused onto the substrate. Indeed, some electrophotographic printing systems use multiple intermediate transfer belts, transferring toner to and from the belts as required to fulfill the requirements of the machine's overall architecture. Suitable toners include both dry toner and liquid toner.

In operation, an intermediate transfer belt is brought into contact with a toner image-bearing member such as a photoreceptor belt. In the contact zone an electrostatic field generating device such as a corotron, a bias transfer roller, a bias blade, or the like creates electrostatic fields that transfer toner onto the intermediate transfer belt. Subsequently, the intermediate transfer belt is brought into contact with a receiver. A similar electrostatic field generating device then transfers toner from the intermediate transfer belt to the receiver. Depending on the system, a receiver can be another intermediate transfer member or a substrate onto which the toner will eventually be fixed. In either case the control of the electrostatic fields in and near the transfer zone is a significant factor in toner transfer.

Intermediate transfer belts often take the form of seamed belts fabricated by fastening two ends of a web material together, such as by welding, sewing, wiring, stapling, or gluing. While seamless intermediate transfer belts are possible, they require manufacturing processes that make them much more expensive than similar seamed intermediate transfer belts. This is particularly true when the intermediate transfer belt is large. While seamed intermediate transfer belts are relatively low in cost, the seam introduces a discontinuity that interferes with the electrical, thermal, and mechanical properties of the belt. While it is possible to synchronize a printer's operation with the motion of the intermediate transfer belt so that toner is not electrostatically transferred onto the seam, such synchronization adds to the printer's expense and complexity, resulting in loss of productivity. Additionally, since high speed electrophotographic printers typically produce images on paper sheets that are cut from a paper "web," if the seam is avoided the resulting unused portion of the paper web must be cut-out, producing waste. Furthermore, even with synchronization the mechanical problems related to the discontinuity, such as excessive cleaner wear and mechanical vibrations, still exist. Additionally, a discontinuity can act as a mechanically weak spot or region in the belt. However, because of the numerous difficulties with transferring toner onto and off of a seamed intermediate transfer belt in the prior art it was necessary to avoid toner transfer onto (and thus off of) a seam.

Acceptable intermediate transfer belts require sufficient seam strength to achieve a desired operating life. While that life depends on the specific application, typically it will be at least 100,000 operating cycles, but more preferably 1,000,000 or more cycles. Considering that a seamed intermediate transfer belt suffers mechanical stresses from belt tension, traveling over rollers, moving through transfer nips, and passing through cleaning and developing systems, achieving such a long operating life is not trivial. Thus the conflicting constraints of long life and limited topographical size at the seam places a premium on adhesive strength and good seam construction.

A prior art "puzzle-cut" approach to seamed belts significantly improves the seam's mechanical strength. U.S. Pat. No. 5,514,436, issued May 7, 1996, entitled, "Puzzle Cut Seamed Belt;" U.S. Pat. No. 5,549,193 entitled "Endless Seamed Belt with Low Thickness Differential Between the Seam and the Rest of the Belt;" and U.S. Pat. No. 5,487,707, issued Jan. 30, 1996, entitled "Puzzle Cut Seamed Belt With Bonding Between Adjacent Surface By UV Cured Adhesive" teach the puzzle-cut approach. While the puzzle-cuts described in the forgoing patents beneficially improve the seam's strength, further improvements would be beneficial. Furthermore, there are other difficulties when transferring toner onto and off of a seam of a seamed intermediate transfer belt.

For a seamed intermediate belt to be acceptable, the final image produced from across the seam must be comparable in quality to images formed across the remainder of the belt. This is a difficult task due to a number of interrelated factors. Some of those factors relate to the fact that the seam should not greatly impact the electrostatic fields used to transfer toner. However, electrostatic transfer fields are themselves dependent on the electrical properties of the intermediate transfer belt. While this dependency is complex, briefly there are conditions where transfer fields are very sensitive to the resistivity and thickness of the materials used for the various layers of the intermediate transfer belt. Under other conditions the electrostatic transfer fields are relatively insensitive to those factors. Similarly, there are conditions where the electrostatic transfer fields are very sensitive to the dielectric constants of the materials used for the layers of the intermediate transfer belt, and other conditions where the electrostatic transfer fields are insensitive to the dielectric constants. Therefore, to successfully transfer toner onto and off of a seamed intermediate transfer belt the electrical properties across and around the seam should be carefully controlled to produce a proper relationship with the remainder of the belt. Since the electrical properties depend on the interrelated factors of seam geometry, seam construction (such as adhesive within and beyond the seam), seam topology, seam thickness, the presence of an overcoating, and various other factors, those factors should be taken into consideration for a given application.

In addition to mechanical strength and electrical compatibility difficulties, there are other problems when transferring toner onto and off of a seam. For example, with most prior art seamed intermediate transfer belts, relatively poor cleaning around the seam was acceptable. However, if toner is being transferred onto and off of the seam region, the seam must be properly cleaned. Thus, the toner release and friction properties across the seam region have to be comparable to those of the rest of the belt. Furthermore, most prior art seamed intermediate transfer belts have a significant "step" where the belt overlaps to form the seam. That step can be as large as 25 microns. Such a step significantly interferes with transfer and cleaning. Thus if toner is transferred onto and off of the seam, the seam's friction, toner release, and topography are much more constrained than those of other seamed intermediate transfer belts. Furthermore, while the step of a puzzle-cut seamed belt is relatively small, belt tension can cause an individual puzzle-cut petal to separate and lift from around neighboring petals. Such lifting introduces localized steps that interfere with blade-based or other contacting type belt cleaners. Such interference can seriously degrade belt and cleaner life.

Therefore, it can be seen that a seam's topography is very important if one wants to transfer toner onto and off of a seam region without significant degradation of the final image. The seam topography includes not only the seam itself, but also any overflow of the adhesive used in the seam.

This overflow can occur on both the toner-bearing side and the back-side of the belt. Adhesive overflow is important because the belt seam strength can depend on that overflow. However, excessive overflow increases various mechanical, electrical, and xerographic problems. Moreover, the adhesive's electrical properties remain important.

More information regarding the requirements of imageable seamed intermediate transfer belts can be found in U.S. Ser. No. 09/460,896 entitled "Imageable Seam Intermediate Transfer Belt Having An Overcoat," by Edward L. Schlueter, Jr. et al., and U.S. Ser. No. 09/460,821 entitled "Imageable Seam Intermediate Transfer Belt," by Gerald M. Fletcher et al., both filed on Dec. 14, 1999. Those patent documents discuss, among other things, "short-wavelength" and "long-wavelength" spatial disturbances, conformable overcoats, Paschen air breakdown, transfer nip air gaps, suitable electrical properties, material layers, material compositions, environmental and aging concerns, cleaning, surface friction, and "set point control" approaches to enable wider tolerances in electrical properties.

The present invention is specifically related to a technique of improving a seam's mechanical properties without significantly degrading other desirable belt properties and allow imaging over the seam of the belt. Imaging on the seam allows the belt surface to be efficiently used. In the case where various paper sizes are used, large interdocument spaces are avoided. The belt can be smaller and allow the case where the document is longer than the ITB circumference. Also, electronic timing where the image avoids the seam is eliminated.

SUMMARY OF THE INVENTION

The principles of the present invention provide for imageable seamed intermediate transfer belts having bonded seams whose properties are influenced by burnishing a material into the seam area or over-coating material into the seam area.

BRIEF DESCRIPTION OF THE DRAWINGS

Other features of the present invention will become apparent as the following description proceeds and upon reference to the drawings, in which.

DETAILED DESCRIPTION OF THE INVENTION

While the principles of the present invention are described below in connection with various embodiments of imageable seamed intermediate transfer belts, and with an embodiment of an electrophotographic marking machine that uses such an imageable seamed intermediate transfer belt, it should be understood that the present invention is not limited to those embodiments. On the contrary, the present invention is intended to cover all alternatives, modifications, and equivalents as may be included within the spirit and scope of the appended claims.

Figure 1:
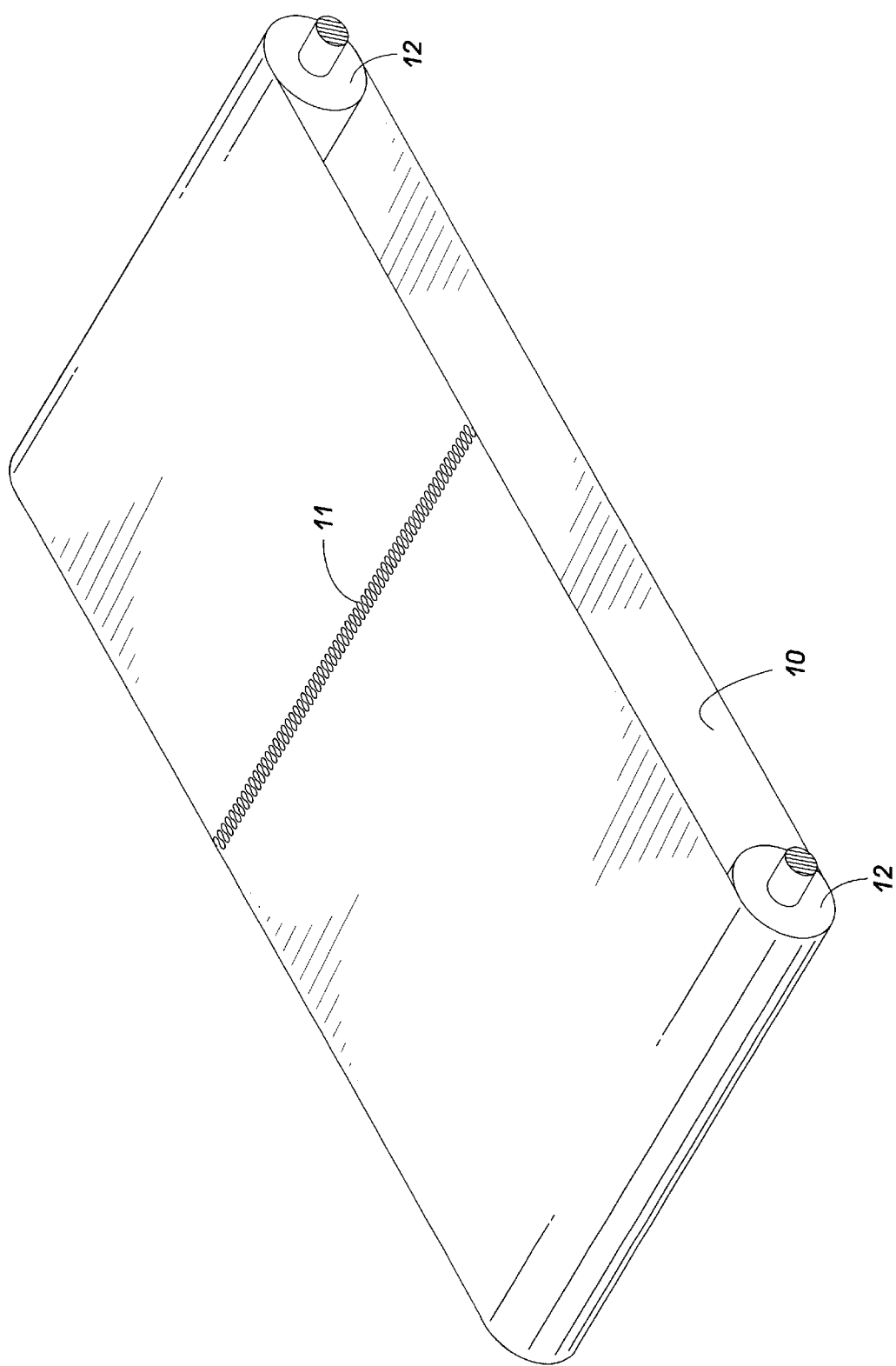
FIG. 1 is an isometric representation of a puzzle-cut seamed intermediate transfer belt.

An embodiment of an imageable seamed intermediate transfer belt 8 is illustrated in FIG. 1. That belt includes a semiconductive substrate layer 10 that has its ends joined together to form a continuous belt using mechanically interlocking "puzzle-cut" tabs that form a seam 11. While the seam is illustrated as being perpendicular to the two parallel sides of the substrate layer the seam could be angled or slanted with respect to the parallel sides. Reference U.S. Pat. Nos. 5,487,707; 5,514,436; 5,549,193; and 5,721,032 for additional information on puzzle-cut patterns. Typically the seam 11 is about ¼ inch wide, but it may be smaller or larger.

The substrate layer 10 can be made from a number of different materials, including polyesters, polyurethanes, polyimides, polyvinyl chlorides, polyolefins (such as polyethylene and polypropylene) and/or polyamides (such as nylon), polycarbonates, or acrylics, or blends or aloys of such materials. If required, the selected material is modified by the addition of an appropriate filler such that the substrate layer has a desired electrical conductivity. Appropriate fillers can include for example carbon, Accufluor® fluorinated carbon black, and/or polyanaline, polythiophene or other conductive fillers or polymers. Donor salts can also be used. The substrate layer material should have the physical characteristics appropriate to an intermediate transfer application, including good tensile strength (Young's modulus, typically $1 \times 10^3$ to $1 \times 10^6$ Newton's/m², resistivity (typically less than $10^{13}$ ohm cm volume resistivity, greater than $10^8$ ohms/square lateral resistivity), thermal conductivity, thermal stability, flex strength, and high temperature longevity). See the previously referenced U.S. patent applications Ser. No. 09/460,896, entitled "Imageable Seam Intermediate Transfer Belt Having An Overcoat," by Edward L. Schlueter, Jr. et al., and Ser. No. 09/460,821 entitled "Imageable Seam Intermediate Transfer Belt," by Gerald M. Fletcher et al., both filed on Dec. 14, 1999.

Figure 2:
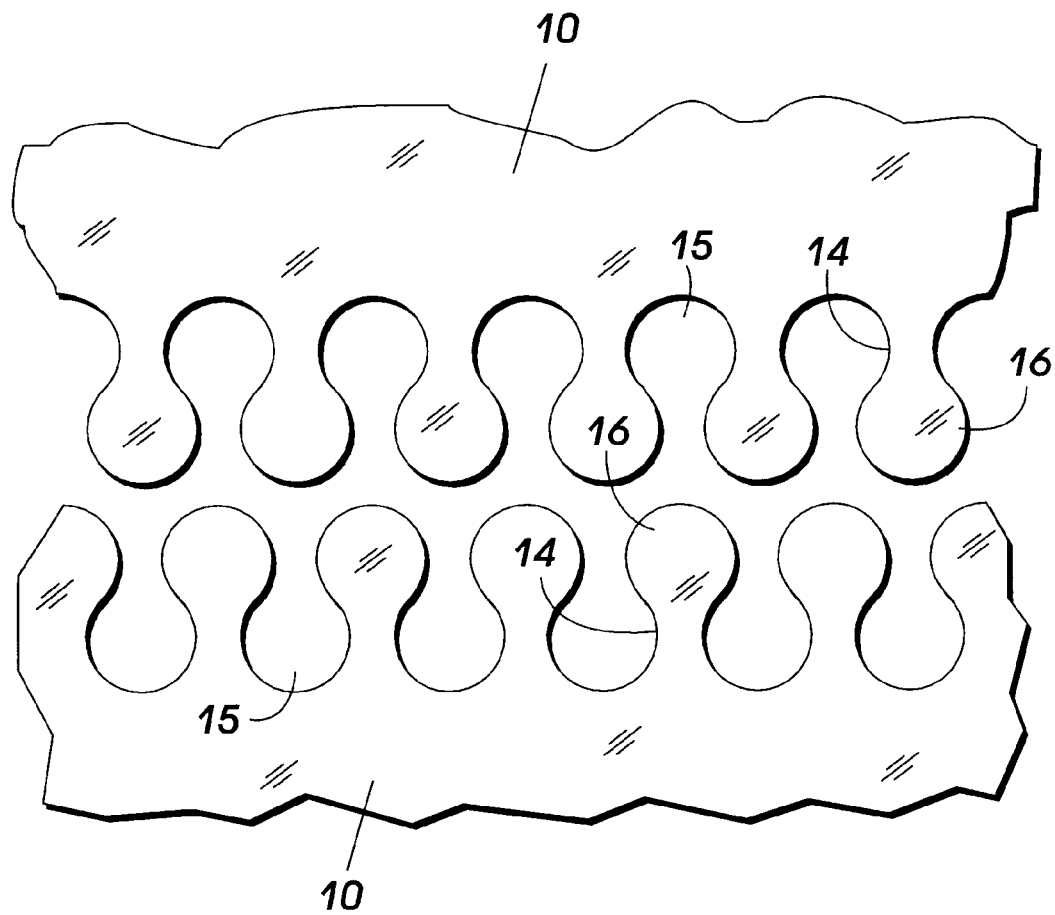
FIG. 2 is a top down view of the puzzle-cut tab pattern used in the belt of FIG. 1.

FIG. 2 shows a top view of the puzzle-cut tab pattern in more detail. Each tab is comprised of a neck 14 and a node 16 that fit into female interlocking portions. The tabs can be formed using any conventional shaping technique, such as die cutting, laser cutting, specifically by using a laser micro-machining system described subsequently, or cutting wheel. The interlocking tab mate so as to reduce the stress concentration between the interlocking elements and to permit easy travel around curved members, such as rollers 12 shown in FIG. 1.

Figure 3:
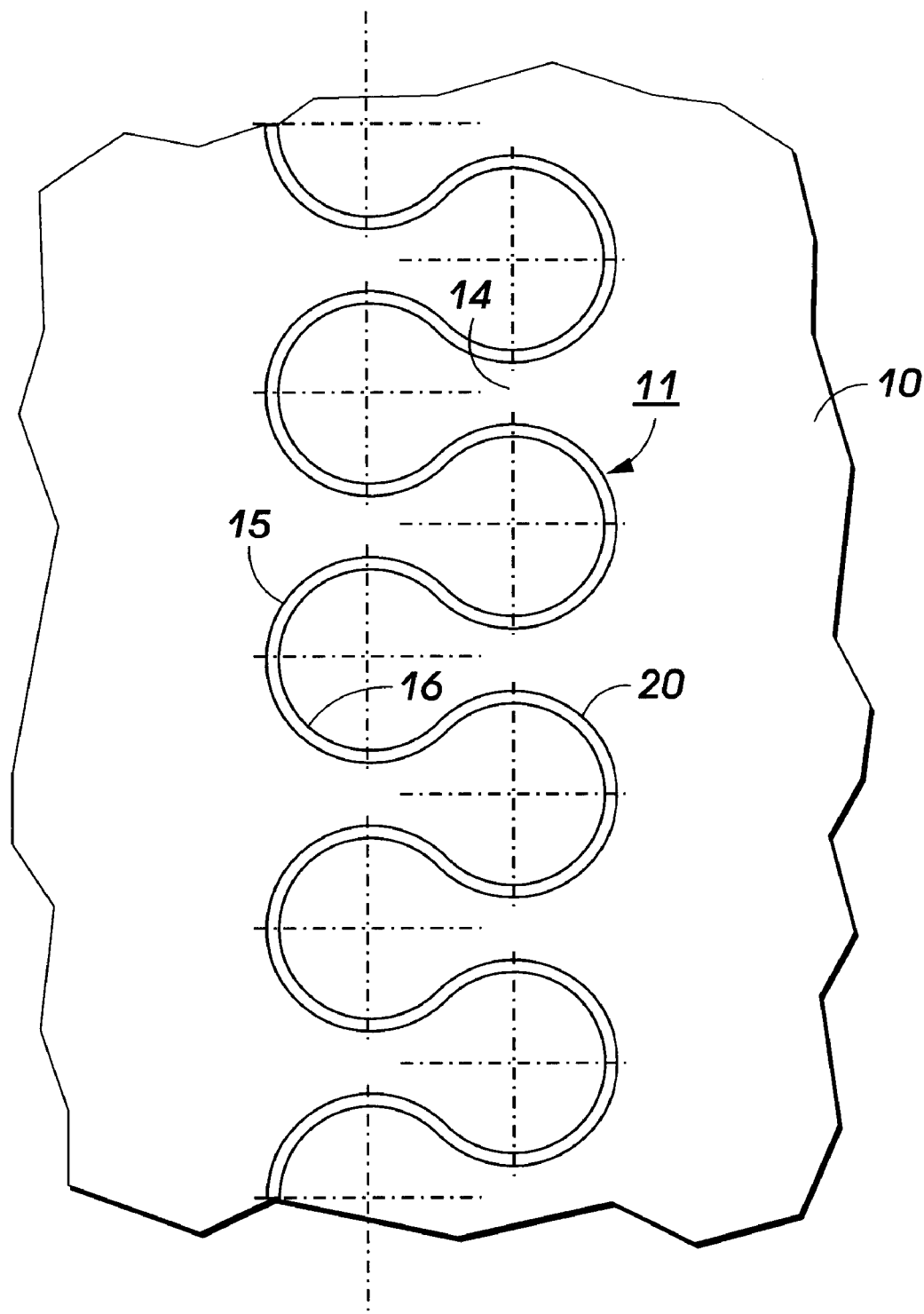
FIG. 3 shows the puzzle-cut tabs of FIG. 2 interlocked together.
Figure 4:
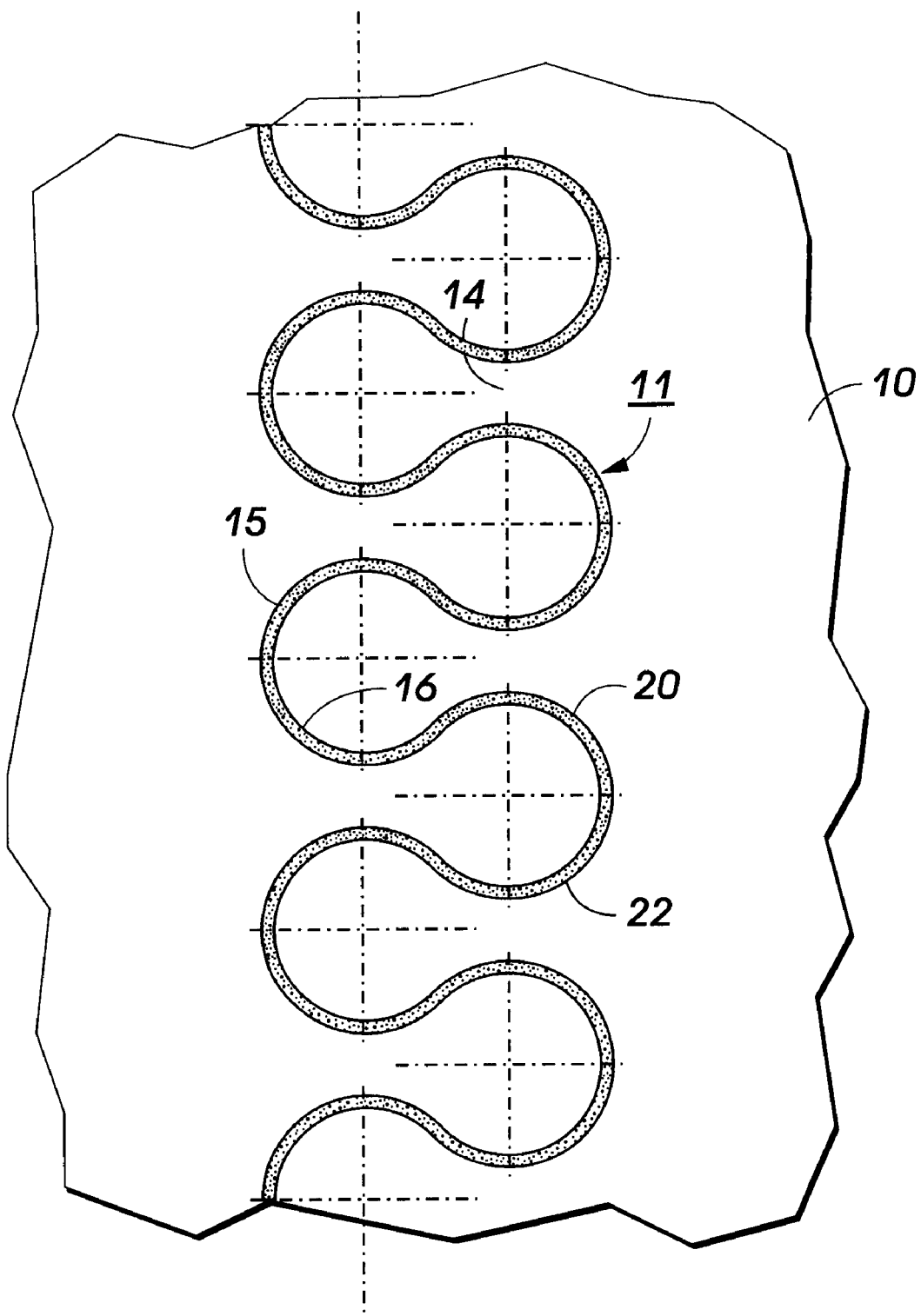
FIG. 4 shows the puzzle-cut tabs of FIG. 3 with the kerf filled with an adhesive.

FIG. 3 shows a top view of the puzzle-cut tabs of FIG. 2 interlocked together. Physically interlocking the puzzle-cut tabs may require pressure when mating the tabs. Interlocking produces a gap between the mutually mating elements that is called a kerf 20. As shown in FIG. 4 the interlocking tabs are held together using an adhesive 22 that fills the kerf. Ideally, the adhesive is physically, chemically, thermally, mechanically, and electrically compatible with the substrate layer material. However, requiring the adhesive to meet all of these properties significantly limits the number of adhesives that can be used. While it is possible to add modifiers to an adhesive to better match the adhesive to the substrate layer material, such modifies may be detrimental to the seam strength. Therefore, as explained subsequently, the principles of the present invention provides for modifying the properties of an adhesive (or other bonding material) after the seam is formed. Seams with a 25 micron kerf have been typical for the puzzle-cut seam while a kerf less than about 5 microns can be preferred.

It should be understood that a seam structure extends along the seam, and that the adhesive 22 is disposed both along the seam and across the seam structure. To that end, the adhesive should have a viscosity such that it readily wicks into the kerf. Additionally, after an imageable seamed intermediate transfer belt is completely fabricated the surface energy of the adhesive should be compatible with the substrate layer material such that the adhesive adequately wets and spreads. Furthermore, the adhesive should remain flexible and should adhere well to the substrate layer material. Finally, the adhesive also should have low shrinkage during curing. As an example, the adhesive can be a hot melt adhesive that is heated and pressed into the seam such that the adhesive is flattened, making it as mechanically uniform as possible with the substrate layer 10. Alternatively, the adhesive can be an epoxy-like material, a UV curable adhesives including acrylic epoxies, polyvinyl butyrals, or the like. Further, the "adhesive" can be substantially the substrate material itself, either applied during a separate adhesive application step or else by melting the two ends sufficiently to cause adhesion of the mutually mating elements. Finally, the adhesives may be modified as required for the particular application. Following the application of the adhesive the seam 11 can be finished by buffing, sanding, or micro polishing to achieve a smooth topography. Again, as explained subsequently, the principles of the present invention provides for modifying the properties of the adhesive (or other bonding material) after the seam is formed.

The relative electrical properties of the adhesive and the substrate are very important because they significantly affect the transfer characteristics of the resulting seam as compared to the transfer characteristics of the rest of the belt. Therefore, the adhesive should produce a seam that has electrical properties that corresponds to that of the substrate layer. That is, under operating conditions a seam should create an electrostatic transfer field in the toner transfer zones that is within at least 20%, preferably within 10%, of the electrostatic transfer field that is present for the remainder of the belt. Ideally the seam electrical properties are substantially the same as the substrate layer and have substantially the same electrical property dependence as the substrate on all important factors, such environment, applied field, and aging. However, significant differences in electrical properties can be allowed for some imageable seam conditions as discussed subsequently. The adhesive electrical properties can be met by mixing fillers or additives with an adhesive. For example, an adhesive might contain silver, indium tin oxide, CuI, $SnO_2$, TCNQ, Quinoline, carbon black, NiO and/or ionic complexes such as quaternary ammonium salts, metal oxides, graphite, or like conductive fillers and conductive polymers such as polyanaline and polythiophenes.

Figure 5:
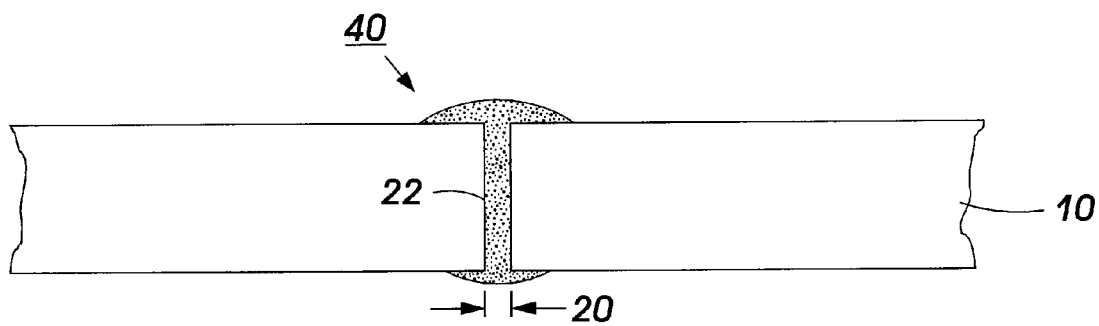
FIG. 5 shows a cross-sectional view of a seam structure during fabrication after initial application of adhesive.

Now referring to FIG. 5, which shows a cross-sectional view of a seam structure during fabrication after initial application of adhesive. In this figure, excess adhesive is shown protruding beyond the top and bottom surface of the belt. This excess adhesive interferes with imaging and transfer.

Figure 6:
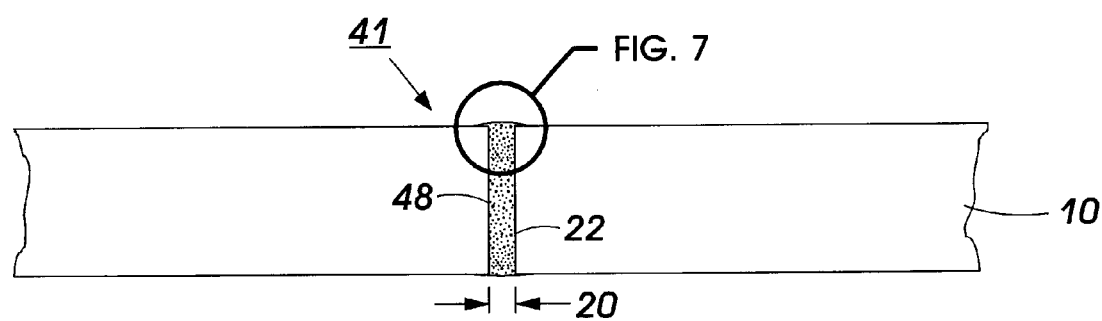
FIG. 6 shows a cross-sectional view of the seam structure of FIG. 5 after removal of excess adhesive.

Now referring to FIG. 6, which shows a cross-sectional view of the seam structure of FIG. 5 after removal of excess adhesive. Most of the excess adhesive is removed by sanding, polishing or other means. The adhesive filled kerf may have conductivity, roughness, frictional and/or release properties different from the belt material and image disturbances may result. In addition, the seam area may be effected by the adhesive application and removal techniques resulting in differences in surface properties which result in image disturbance.

Figure 7:
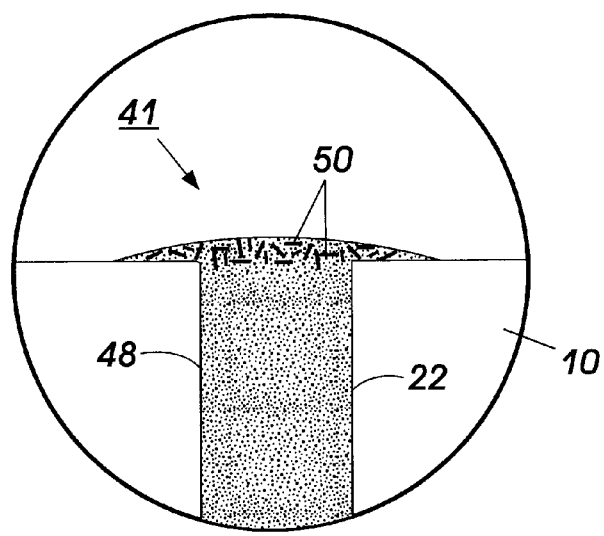
FIG. 7 shows a cross-sectional view of the seam structure of FIG. 6 after burnishing a material into the top surface.

Now referring to FIG. 7, which shows a cross-sectional view of the seam structure of FIG. 6 after burnishing a material into the top surface. The burnishing material is transferred to and blended with the adhesive at the top surface of the adhesive imparting the desirable characteristics to the adhesive.

Conductive and semiconductive materials such as silver, indium tin oxide, CuI, SnO2, TCNQ, Quinoline, carbon black, NiO and/or ionic complexes such as quaternary ammonium salts, metal oxides, graphite, or like conductive fillers and conductive polymers such as polyanaline and polythiophenes are materials intended to improve transfer in the seam area by lowering surface energy and improve cleaning by lowering friction. A friction coefficient less than about 1.0, and preferably less than 0.5, is suitable. Preferred burnishing materials include low surface free energy materials such as TEFLON™ type fluoropolymers, including fluorinated ethylene propylene copolymer (FEP), polyytetrafluoroethylene (PTFE), polyfluoroalkoxy polyytetrafluoroethylene (PFA TEFLON™); fluoroelastomers such as those sold by DuPont under the tradename VITON™; and silicone materials such as fluorosilicones and silicone rubbers.

Figure 8:
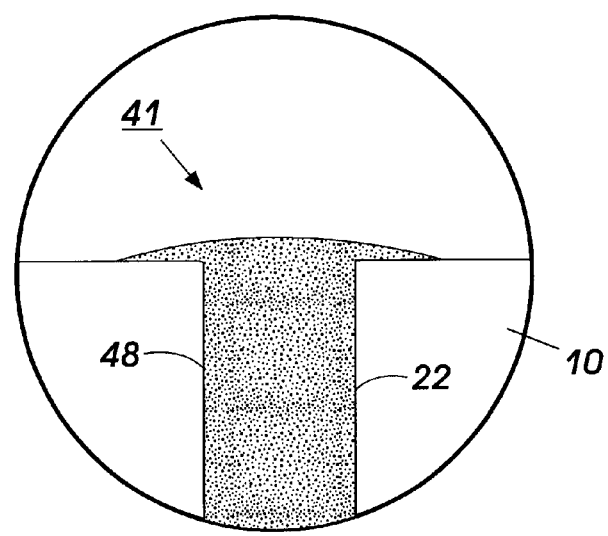
FIG. 8 shows a cross-sectional view of the seam structure of FIG. 6 after over-coating a material into the top surface.

Now referring to FIG. 8, which shows a cross-sectional view of the seam structure of FIG. 6 after over-coating a material into the top surface. An overcoat is applied to the seam area such that the adhesive material is covered and if necessary, the area of belt effected by sanding or otherwise removing the excess adhesive. Preferred overcoating materials include low surface free energy materials such as TEFLON™ type fluoropolymers, including fluorinated ethylene propylene copolymer (FEP), polytetrafluoroethylene (PTFE), polyfluoroalkoxy polytetrafluoroethylene (PFA TEFLON™); fluoroelastomers such as those sold by DuPont under the tradename VITON™; and silicone materials such as fluorosilicones and silicone rubbers.

Figure 9:
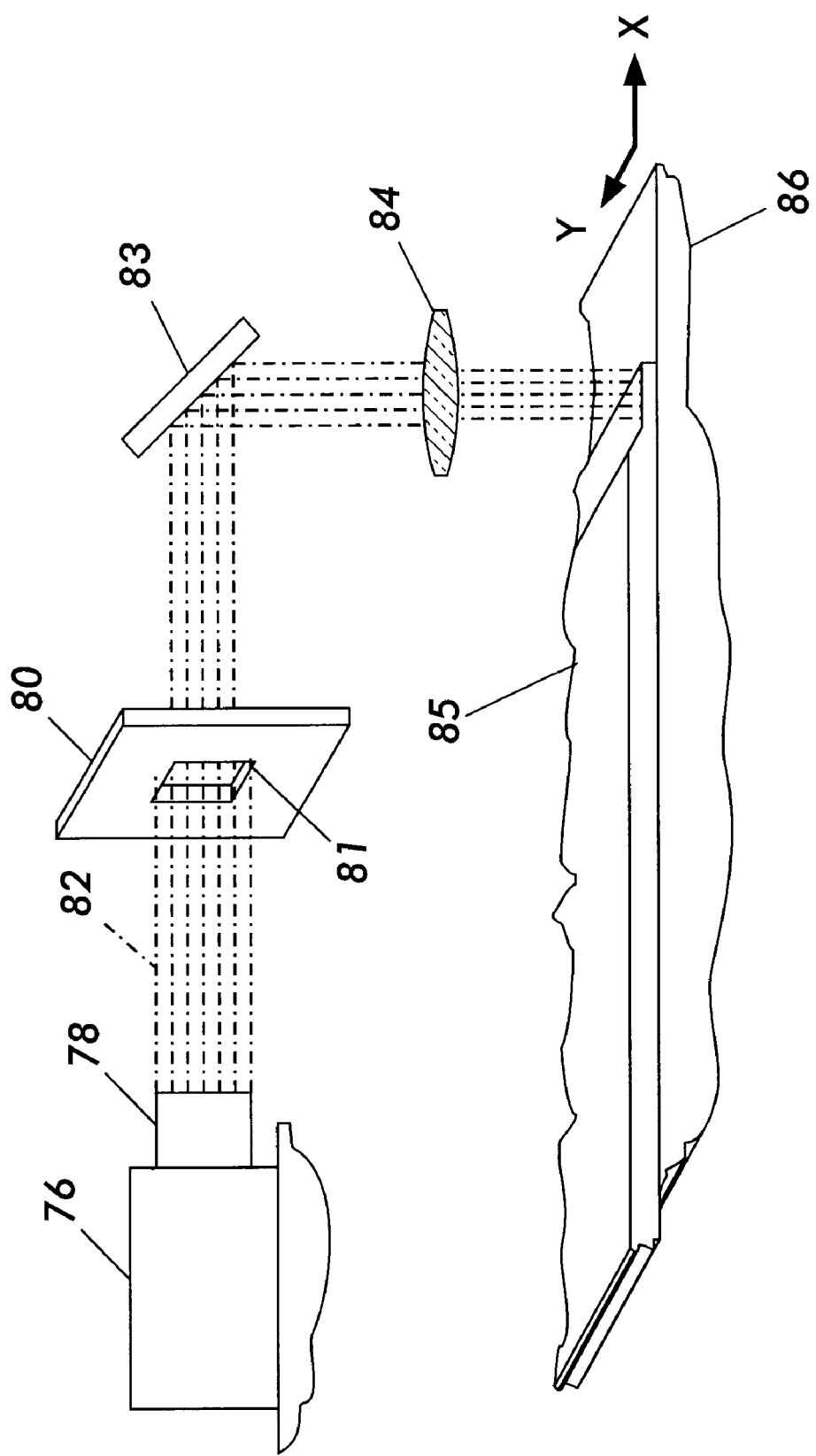
FIG. 9 shows a perspective, schematic view of a laser micro-machining system that is suitable for producing puzzle-cut seam structures.

One relatively simple, low cost process for continuous manufacture of puzzle-cut seamed intermediate transfer belts having 3-dimensional seam structures is laser micro-machining. FIG. 9 is a perspective, schematic view of a suitable laser micro-machining system.

As shown in FIG. 9, a fixed laser 76 having beam-spreading optics 78 illuminates a quartz glass mirrored-surface 80 (or thin metal mask) bearing a mask 81 having a desired cutting pattern with a laser beam 82. The laser beam 82 passes through the mask only in the desired cutting pattern. Typically, the mask features are 2–10 times larger than the actual desired cutting pattern. For convenience, a mirror 83 directs the laser beam along a desired path. A focusing and de-magnification lens 84 is appropriately positioned in the desired path between the mask 81 and a belt substrate 85 that is being micro-machined. The lens 84 appropriately de-magnifies the cutting pattern such that the desired features can be cut into the belt substrate. The mask pattern causes the belt substrate to be illuminated with the shape of one or more features that are to be produced. For example, a rectangular cut can be laser milled in the belt edge by illuminating the belt substrate appropriately. A feature can be continuously cut across the width of the belt by moving the belt material using a vacuum stage X-Y platform 86, or by using some other suitable apparatus.

Complex features can be cut using two or more masks, each mask having an appropriately sized feature. Features can then be successively aligned to produce the complex feature. For example, one mask might be used to cut a step along an edge of a belt substrate during a first pass, and then another mask might cut an embedded profile within that step during a second pass. Furthermore, the laser micro-machining process might use only one laser to process both ends of the belt, or plural lasers might be used. For example, a laser might be dedicated to each end of the belt, and/or multiple lasers might work on each end.

In any event, after the belt is laser micro-machined a suitable adhesive is placed over the mating surfaces, the puzzle-cut seams and their seam structures are interlocked, and then the adhesive is cured.

As will be readily understood by those skilled in the appropriate arts, the optimum laser system, energy density, and/or pulse repetition rates will depend upon the particular application. Significant variables include the particular belt material and its thickness, the required cutting/milling rate, the belt material motion, the pattern being produced, and the required feature accuracy. However, to provide a starting point, an ultraviolet (UV) laser having a wavelength of 248 nm or 192 nm will generally be suitable for cutting belts of polyaniline and carbon-black filled polyimide substrates, including those having polyanaline and or zeloc filled polyimide films. Suitable lasers include Excimer and triple frequency multiplied YAG lasers (which are believed capable of effectively producing suitable UV frequencies).

Figure 10:
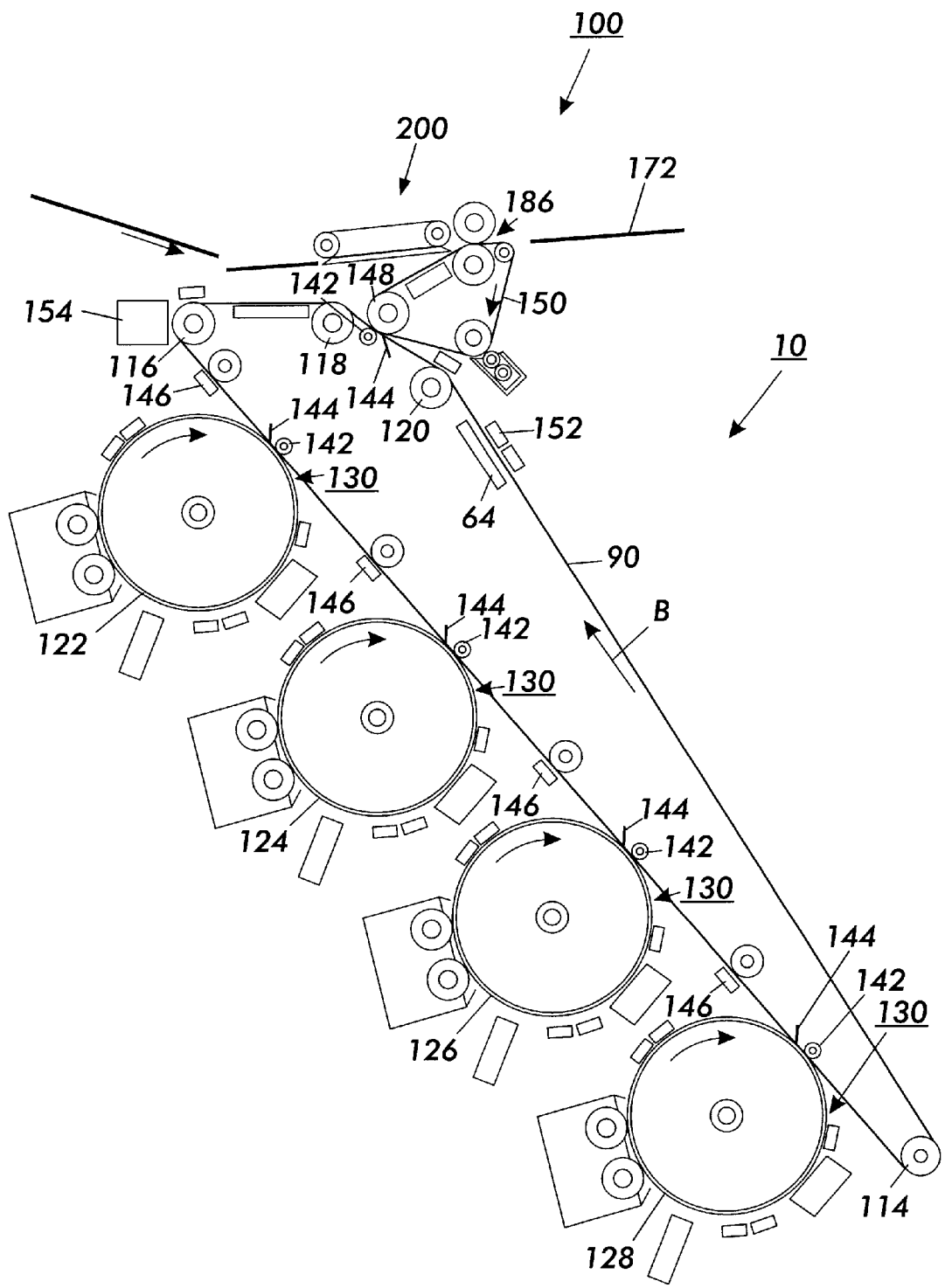
FIG. 10 illustrates an electrophotographic marking machine that includes a puzzle-cut seamed intermediate transfer belt that is in accord with the principles of the present invention.

An electrophotographic marking machine 100 that makes beneficial use of imageable seamed intermediate transfer belts is illustrated in FIGS. 9 and 10. With reference to those figures the electrostatographic printer 100 includes an imageable seam intermediate transfer belt 90 that is driven over guide rollers 114, 116, 118, and 120. The imageable seam intermediate transfer belt is formed using rabbeted tongues. The imageable seam intermediate transfer belt 90 moves in a process direction shown by the arrow B. For purposes of discussion, the imageable seamed intermediate transfer belt includes sections that will be referred to as toner areas. A toner area is that part of the intermediate transfer belt that receives actions from the various stations positioned around the imageable seamed intermediate transfer belt. While the imageable seamed intermediate transfer belt may have multiple toner areas each toner area is processed in the same way.

A toner area is moved past a set of four toner image stations 122, 124, 126, and 128. Each toner image station operates to place a unique color toner image on the toner image of the imageable seamed intermediate transfer belt 90. Each toner image producing station operates in the same manner to form developed toner image for transfer to the imageable seamed intermediate transfer belt.

While the image producing stations 122, 124, 126, 128 are described in terms of photoreceptive systems, they may also be ionographic systems or other marking systems that form developed toner images. Each toner image producing station 122, 124, 126, 128 has an image bearing member 130. The image bearing member 130 is a drum supporting a photoreceptor 121 (see FIG. 10).

Turn now to FIG. 10, which shows an exemplary toner image producing station. That image bearing station generically represents each of the toner image producing station 122, 124, 126, 128. As shown, the photoreceptor 121 is uniformly charged at a charging station 132. The charging station is of well-known construction, having charge generation devices such as corotrons or scorotrons for distribution of an even charge on the surface of the image bearing member. An exposure station 134 exposes the charged photoreceptor 121 in an image-wise fashion to form an electrostatic latent image on an image area. The image area is that part of the image bearing member which receives the various processes by the stations positioned around the image bearing member 130. The image bearing member may have multiple image areas; however, each image area is processed in the same way.

The exposure station 134 preferably has a laser emitting a modulated laser beam. The exposure station then raster scans the modulated laser beam onto the charged image area.

The exposure station 134 can alternately employ LED arrays or other arrangements known in the art to generate a light image representation that is projected onto the image area of the photoreceptor 121. The exposure station 134 exposes a light image representation of one color component of a composite color image onto the image area to form a first electrostatic latent image. Each of the toner image producing stations 122, 124, 126, 128 will form an electrostatic latent image corresponding to a particular color component of a composite color image.

The exposed image area is then advanced to a development station 136. The developer station 136 has a developer corresponding to the color component of the composite color image. Typically, therefore, individual toner image producing stations 122, 124, 126, and 128 will individually develop the cyan, magenta, yellow, and black that make up a typical composite color image. Additional toner image producing stations can be provided for additional or alternate colors including highlight colors or other custom colors. Therefore, each of the toner image producing stations 122, 124, 126, 128 develops a component toner image for transfer to the toner area of the imageable seam intermediate transfer belt 90. The developer station 136 preferably develops the latent image with a charged dry toner powder to form the developed component toner image. The developer can employ a magnetic toner brush or other well-known development arrangements.

The image area having the component toner image then advances to the pretransfer station 138. The pretransfer station 138 preferably has a pretransfer charging device to charge the component toner image and to achieve some leveling of the surface voltage above the photoreceptor 121 to improve transfer of the component image from the image bearing member 130 to the imageable seamed intermediate transfer member 90. Alternatively the pretransfer station 138 can use a pretransfer light to level the surface voltage above the photoreceptor 121. Furthermore, this can be used in cooperation with a pretransfer charging device.

The image area then advances to a transfer nip 140 defined between the image bearing member 130 and the imageable seamed intermediate transfer belt 90. The image bearing member 130 and imageable seamed intermediate transfer belt are synchronized such that each has substantially the same linear velocity at the first transfer nip 140. The component toner image is then electrostatically transferred from the image bearing member 130 to the imageable seamed intermediate transfer belt by use of a field generation station 142. The field generation station 142 is preferably a bias roller that is electrically biased to create sufficient electrostatic fields of a polarity opposite that of the component toner image to thereby transfer the component toner image to the imageable seam intermediate transfer belt. Alternatively the field generation station can be a corona device or other various types of field generation systems known in the art. A prenip transfer blade 144 mechanically biases the imageable seam intermediate transfer belt 90 against the image bearing member 130 for improved transfer of the component toner image.

After transfer of the component toner image, the image bearing member 130 then continues to move the image area past a preclean station 139. The preclean station employs a pre clean corotron to condition the toner charge and the charge of the photoreceptor 121 to enable improved cleaning of the image area. The image area then further advances to a cleaning station 141. The cleaning station 141 removes the residual toner or debris from the image area. The cleaning station 141 preferably has blades to wipe the residual toner particles from the image area. Alternately the cleaning station 141 can employ an electrostatic brush cleaner or other well-known cleaning systems. The operation of the cleaning station 141 completes the toner image production for each of the toner image producing stations.

Figure 11:
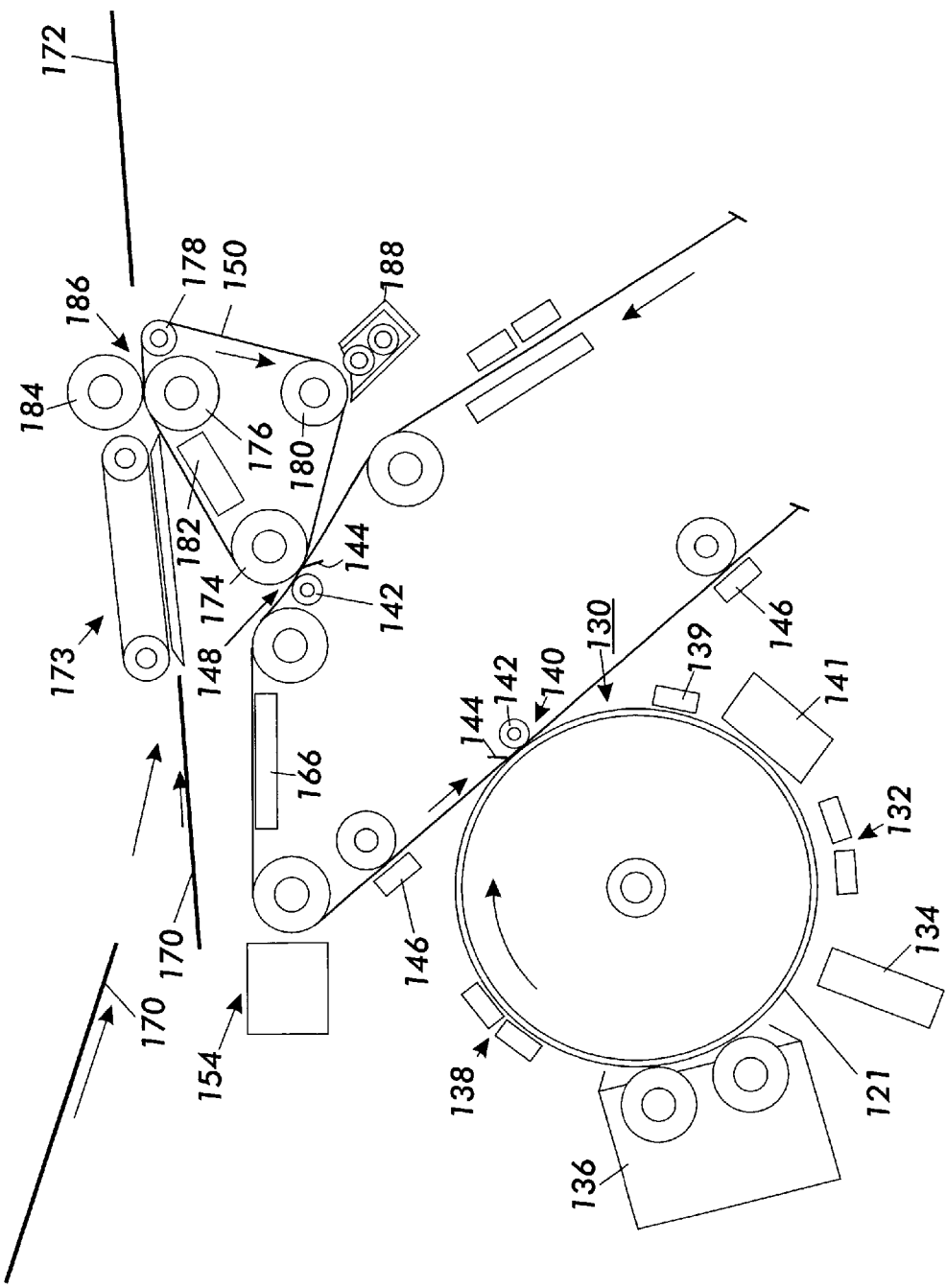
FIG. 11 is an enlarged schematic depiction of a fusing station used in the color electrophotographic marking machine of FIG. 10.

Turning back to FIG. 11, the individual toner image producing stations 122, 124, 126, and 128 each transfer their toner images onto the imageable seamed intermediate transfer belt 90. A first component toner image is advanced onto the imageable seamed intermediate transfer belt at the transfer nip of the image producing station 122. Prior to the toner area arriving at that transfer nip the toner area is uniformly charged by a conditioning station 146. This reduces the impact of any stray, low or oppositely charged toner that might result in back transfer of toner into the image producing station 122. Such a conditioning station is positioned before each transfer nip.

The toner images from the individual toner image producing stations 122, 124, 126, and 128 are transferred such that the images are registered. That is, each of the individual color component images are transferred onto the imageable seamed intermediate transfer belt 90 such that the human eyes perceives a desired composite color image.

The imageable seamed intermediate transfer belt 90 then transports the composite toner image to a pre-transfer charge conditioning station 152 that levels the charges at the toner area of the imageable seamed intermediate transfer belt and prepares them for transfer to a transfuse member 150. The pre-transfer charge conditioning station 152 is preferably a scorotron. A second transfer nip 148 is defined between the imageable seamed intermediate transfer belt 90 and the transfuse member 150. A field generation station 142 and a pre-transfer nip blade 144 engage the imageable seamed intermediate transfer belt and perform similar functions as the field generation stations 142 and pre-transfer blades 144 adjacent the transfer nips 140. The composite toner image is then transferred electrostatically onto the transfuse member 150.

The transfer of the composite toner image at the second transfer nip 148 can be heat assisted if the temperature of the transfuse member 150 is maintained at a sufficiently high optimized level and the temperature of the imageable seam intermediate transfer belt 90 is maintained at a considerably lower optimized level prior to the second transfer nip 148. The mechanism for heat assisted transfer is thought to be softening of the composite toner image during the dwell time of contact of the toner in the second transfer nip 148. This composite toner softening results in increased adhesion of the composite toner image toward the transfuse member 150 at the interface between the composite toner image and the transfuse member. This also results in increased cohesion of the layered toner pile of the composite toner image. The temperature on the imageable seam intermediate transfer belt prior to the second transfer nip 148 needs to be sufficiently low to avoid too high a toner softening and too high a resultant adhesion of the toner to the imageable seam intermediate transfer belt. The temperature of the transfuse member should be considerably higher than the toner softening point prior to the second transfer nip to insure optimum heat assist in the second transfer nip 148. Further, the temperature of the imageable seam intermediate transfer belt 90 just prior to the second transfer nip 148 should be considerably lower than the temperature of the transfuse member 150 for optimum transfer in the second transfer nip 148.

Turning now to FIG. 9, the transfuse member 150 is guided in a cyclical path by guide rollers 174, 176, 178, 180.

Guide rollers 174, 176 alone or together are preferably heated to thereby heat the transfuse member 150. The imageable seamed intermediate transfer belt 90 and transfuse member 150 are preferably synchronized to have the generally same velocity in the transfer nip 148. Additional heating of the transfuse member is provided by a heating station 182. The heating station 182 is preferably formed of infra-red lamps positioned internally to the path defined by the transfuse member 150. The transfuse member 150 and a pressure roller 184 form a third transfer nip 186.

A releasing agent applicator 188 applies a controlled quantity of a releasing material, such as a silicone oil to the surface of the transfuse member 150. The releasing agent serves to assist in release of the composite toner image from the transfuse member 150 in the third transfer nip 186.

The transfuse member 150 preferably has a top most layer formed of a material having a low surface energy, for example silicone elastomer, fluoroelastomers such as Viton™, polytetrafluoroethylene, perfluoralkane, and other fluorinated polymers. The transfuse member 150 will preferably have intermediate layers between the top most and back layers constructed of a Viton™ or silicone with carbon or other conductivity enhancing additives to achieve the desired electrical properties. The back layer is preferably a fabric modified to have the desired electrical properties. Alternatively the back layer can be a metal such as stainless steel.

A substrate 170 is then advanced toward the third transfer nip 186. The substrate 170 is transported and registered by a material feed and registration system into a substrate pre-heater 173. The substrate pre-heater 173 includes a transport belt that moves the substrate 170 over a heated platen. The heated substrate 170 is then directed into the third transfer nip 186.

At the third transfer nip the composite toner image is transferred and fused to the substrate 170 by heat and pressure to form a completed document 172. The document 172 is then directed into a sheet stacker or other well known document handing system (not shown).

A cooling station 166 cools the imageable seamed intermediate transfer belt 90 after the second transfer nip 148. A cleaning station 154 engages the imageable seamed intermediate transfer belt and removes oil, toner or debris that may remain on the imageable seamed intermediate transfer belt. The cleaning station 154 is preferably a cleaning blade alone or in combination with an electrostatic brush cleaner, or a cleaning web.

While the foregoing is sufficient to understand the general operation of electrophotographic printing machines that use imageable seamed intermediate transfer belts, practical systems are somewhat difficult to achieve. This is because imageable seamed intermediate transfer belts that produce acceptable final images, such as the imageable seamed intermediate transfer belt 90, are subject to numerous electrical and mechanical constraints, limitations, and design problems. More detailed discussions of those constraints, limitations, and design problems are found in U.S. Ser. No. 09/460,896 entitled, "Imageable Seam Intermediate Transfer Belt Having An Overcoat," in U.S. Ser. No. 09/460,821 entitled "Imageable Seam Intermediate Transfer Belt," both filed on Dec. 14, 1999, and in U.S. Ser. No. 09/634,307, entitled "Electrophotographic Marking Machine Having An Imageable Seam Intermediate Transfer Belt," filed on Aug. 8, 2000.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method for making an imageable seamed intermediate transfer belt having an inner surface and an outer surface having predefined surface properties, comprising:

joining together an end portion of a first semiconductive substrate to an end portion of a second semiconductive substrate to form a seam, applying an adhesive material into the seam;

burnishing the adhesive material in seam to substantially imitate predefined surface properties of the belt, said burnishing step comprises the step of polishing the outer surface of said seam with a material to impart conductivity and release properties of said belt to the adhesive in said seam, and finishing the adhesive material after curing of the adhesive material, before said burnishing step.

2. The method of claim 1, wherein said polishing step includes the step of: applying conductive or semiconductive materials to the seam.

\* \* \* \* \*